US012078136B2

(12) United States Patent
Svensson et al.

(10) Patent No.: US 12,078,136 B2
(45) Date of Patent: Sep. 3, 2024

(54) FUEL INJECTOR NOZZLE ASSEMBLY INCLUDING NEEDLE HAVING FLOW GUIDING TIP FOR DIRECTING FUEL FLOW

(71) Applicant: Caterpillar Inc., Peoria, IL (US)

(72) Inventors: Kenth I Svensson, Peoria, IL (US); Russell P Fitzgerald, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/749,904

(22) Filed: May 20, 2022

(65) Prior Publication Data

US 2023/0374961 A1 Nov. 23, 2023

(51) Int. Cl.

*F02M 47/02* (2006.01)
*F02M 61/10* (2006.01)
*F02M 61/18* (2006.01)

(52) U.S. Cl.

CPC ............ *F02M 47/02* (2013.01); *F02M 61/10* (2013.01); *F02M 61/1806* (2013.01); *F02M 61/1853* (2013.01); *F02M 61/1886* (2013.01)

(58) Field of Classification Search

CPC ........ F02M 47/02; F02M 61/10; F02M 61/18; F02M 61/1806; F02M 61/1853; F02M 61/1886

See application file for complete search history.

(56) References Cited

U.S. PATENT DOCUMENTS

| | | | | |
|---|---|---|---|---|
| 6,427,932 | B1 * | 8/2002 | Danckert | F02M 61/18 239/533.12 |
| 6,892,965 | B2 * | 5/2005 | Haeberer | F02M 61/047 239/533.3 |
| 7,128,280 | B1 | 10/2006 | Boecking | |
| 8,002,205 | B2 * | 8/2011 | Lambert | F02M 61/1873 123/446 |
| 8,720,802 | B2 | 5/2014 | Kerst | |
| 10,487,787 | B2 | 11/2019 | Martin | |
| 10,865,754 | B2 * | 12/2020 | Lopez | F02M 61/1886 |
| 2006/0032947 | A1 | 2/2006 | Boecking | |
| 2006/0231065 | A1 * | 10/2006 | Pontoppidan | F02M 61/1826 123/305 |

(Continued)

FOREIGN PATENT DOCUMENTS

| | | | |
|---|---|---|---|
| DE | 3810467 | A1 | 10/1989 |
| DE | 19942370 | A1 | 3/2001 |

(Continued)

OTHER PUBLICATIONS

Written Opinion and International Search Report for Int'l. Patent Appln. No. PCT/US2023/019526, mailed Jul. 13, 2023 (11 pgs).

*Primary Examiner* — Logan M Kraft
*Assistant Examiner* — Johnny H Hoang
(74) *Attorney, Agent, or Firm* — Brannon Sowers & Cracraft PC

(57) ABSTRACT

A fuel injector includes a nozzle needle movable within an injector housing and including a flow guiding tip. The flow guiding tip includes an outer ramp surface, defining, in profile, a concave curve and a fuel trajectory line tangent to the concave curve and extending through a spray orifice inlet to direct fuel into the same. Related methodology is also disclosed.

20 Claims, 3 Drawing Sheets

(56) References Cited

U.S. PATENT DOCUMENTS

| | | | | |
|---|---|---|---|---|
| 2008/0067268 | A1* | 3/2008 | Kaneko | F02M 61/1833 29/890.142 |
| 2008/0142621 | A1* | 6/2008 | Kerst | F02M 61/1873 239/584 |
| 2019/0063392 | A1* | 2/2019 | Ishii | F02M 61/18 |
| 2020/0102922 | A1* | 4/2020 | Kataoka | F02M 61/042 |

FOREIGN PATENT DOCUMENTS

| | | | |
|---|---|---|---|
| DE | 102007062701 | A1 | 7/2009 |
| GB | 2186632 | A | 8/1987 |
| JP | 2007162535 | | 6/2007 |

* cited by examiner

FUEL INJECTOR NOZZLE ASSEMBLY INCLUDING NEEDLE HAVING FLOW GUIDING TIP FOR DIRECTING FUEL FLOW

TECHNICAL FIELD

The present disclosure relates generally to a fuel injector, and more particularly to a nozzle needle in a fuel injector having a flow guiding tip for directing fuel directly into spray orifices.

BACKGROUND

Fuel systems are among the most complex and sensitive parts of internal combustion engine systems. In compression-ignition engines in particular a multiplicity of rapidly moving parts subjected to pressure extremes and pressure changes are operated in various fuel injectors and pumps to reliably and precisely inject fuel at desired timings and in a desired manner. In a typical directly controlled fuel injector hydraulic pressure is varied on a closing hydraulic surface of a needle that is opened and closed by operating a solenoid actuator. When the needle lifts, pressurized fuel can flow to spray orifices and is injected into a combustion cylinder in an engine, typically as a direct injection. When the needle is closed the fuel injection terminates.

It has been observed that even seemingly minuscule improvements in the manner of fuel flow within the injector can bring significant benefits. It has also been observed that even tiny amounts of residual fuel remaining in a fuel injector tip after needle closing can have deleterious effects on performance. The results of changes to fuel injector geometry or operation can be quite unpredictable, however. Engineers have thus experimented for decades as to ways in which nozzle needle operation and geometry can be optimized to provide various benefits. One known fuel injector configuration apparently providing reduced sac volume and fracture resistance in a fuel injector is known from U.S. Pat. No. 10,865,754B2 to Lopez et al.

SUMMARY

In one aspect, a fuel injector includes an injector housing defining a longitudinal axis and having formed therein each of a fuel inlet, a nozzle passage extending to a spray orifice having a spray orifice inlet and a spray orifice outlet, and a needle seat. The fuel injector further includes a nozzle needle movable within the injector housing between a closed needle position blocking the spray orifice from the nozzle passage, and an open needle position. The nozzle needle includes a seating surface in contact with the needle seat at the closed needle position, and a flow guiding tip. The flow guiding tip includes an outer ramp surface extending axi-symmetrically around the longitudinal axis and defining, in profile, a concave curve originating at an axially inward location and terminating at an axially outward location, and a fuel trajectory line that is tangent to the concave curve at the axially outward location and extends through the spray orifice inlet at the closed needle position.

In another aspect, a fuel injector nozzle assembly includes a nozzle body having a needle seat, an end bulb, and a plurality of spray orifices formed in the end bulb and arranged at a plurality of spray orifice angular locations around a longitudinal axis. The fuel injector nozzle assembly further includes a nozzle needle movable relative to the needle seat, and including a seating surface in contact with the needle seat. A sac volume fluidly connected to each of the plurality of spray orifices is defined within the end bulb between the nozzle needle and the nozzle body. The nozzle needle further includes a flow guiding tip having an outer ramp surface exposed to the sac volume and having a concave profile defining a fuel path extending, at each of the plurality of spray orifice angular locations, directly into the plurality of spray orifices.

In still another aspect, a method of operating a fuel system includes moving a nozzle needle in a fuel injector from a closed needle position closing a needle seat and blocking a sac volume from a nozzle passage in the fuel injector, to an open needle position where the needle seat is open. The method further includes advancing a pressurized fuel through the sac volume from the nozzle passage to a plurality of spray orifices of the fuel injector based on the moving the nozzle needle. The method still further includes impinging the pressurized fuel advanced through the sac volume upon a concave ramp surface of a flow guiding tip of the nozzle needle defining fuel trajectory lines at each of a plurality of spray orifice locations extending into the plurality of spray orifices.

DETAILED DESCRIPTION

Figure 1:
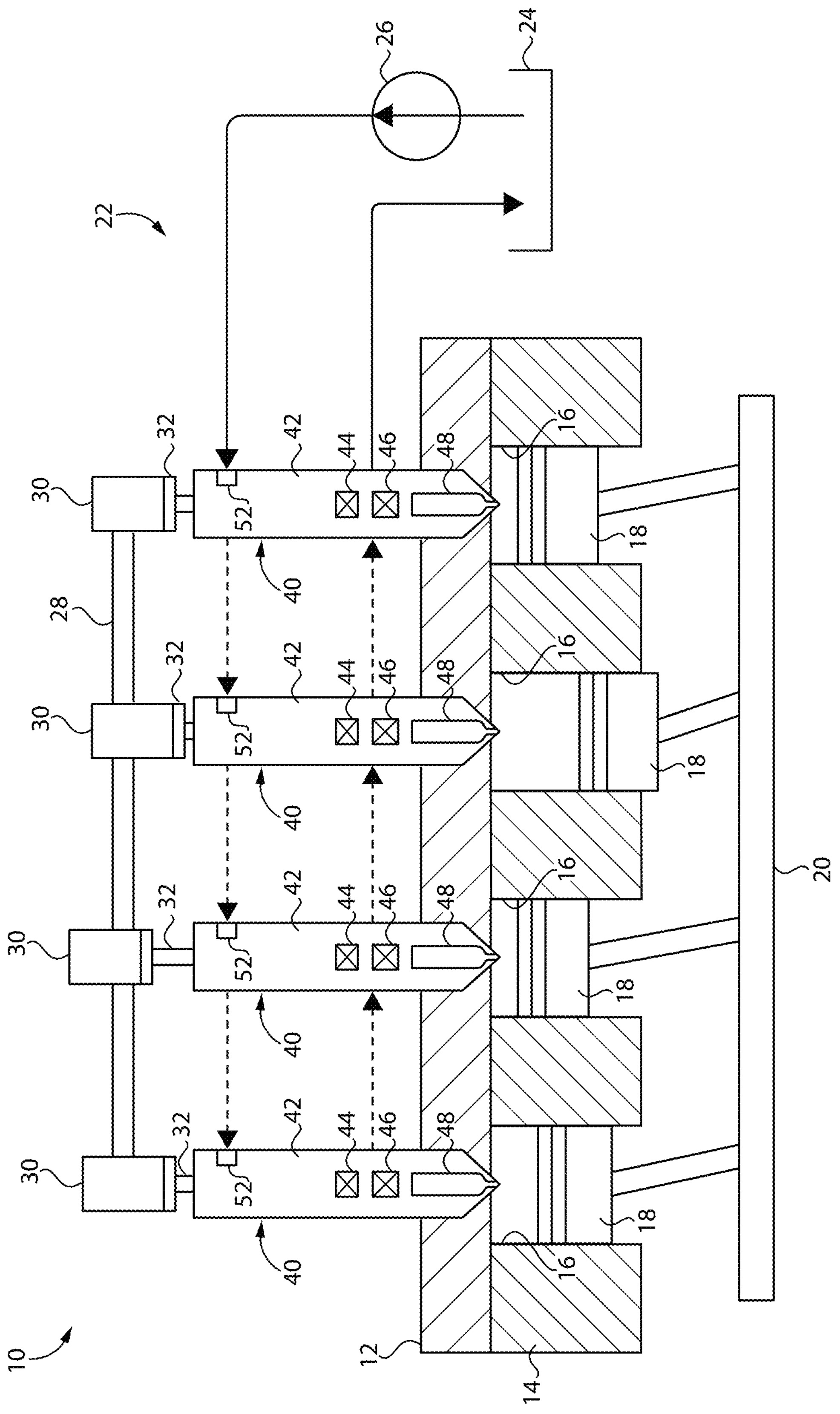
FIG. 1 is a diagrammatic view of an internal combustion engine system, according to one embodiment.

Referring to FIG. 1, there is shown an internal combustion engine system 10, according to one embodiment. Engine system 10 includes an internal combustion engine 12 having an engine housing 14 with a plurality of combustion cylinders 16 formed therein. Cylinders 16 can include any number in any suitable arrangement, such as an in-line pattern, a V-pattern, or still another. Pistons 18 are positioned one within each of cylinders 16 and each movable between a bottom-dead-center position and a top-dead-center position, typically in a four-stroke pattern, to rotate a crankshaft 20. Engine system 10 also includes a fuel system 22 having a fuel supply or tank 24, and a pump 26 structured to feed a fuel for injection to a plurality of fuel injectors 40. Fuel injectors 40 are configured as direct fuel injectors each positioned to directly inject a fuel into one of cylinders 16. In an implementation, engine system 10 is a compression-ignition engine although the present disclosure is not thereby limited. Fuel supply 24 may thus contain a suitable compression-ignition fuel, such as a diesel distillate fuel. In the illustrated embodiment fuel injectors 40 operate to pressurize fuel to an injection pressure by way of tappets 32 each coupled to a cam 30 on a camshaft 28 and to a plunger within the respective fuel injector 40. Those skilled in the art will recognize fuel injectors 40 as so-called unit injectors. In other embodiments, rather than unit injectors a pressurized fuel reservoir or common rail could be used to maintain a volume of fuel at an injection pressure that is fed to each individual fuel injector. Still other implementations could include cam-actuated pumps that pressurize fuel for more than one, but less than all, of the fuel injectors in fuel system 22. The present disclosure is contemplated to be applicable without regard to the particular manner of fuel pressurization.

Figure 2:
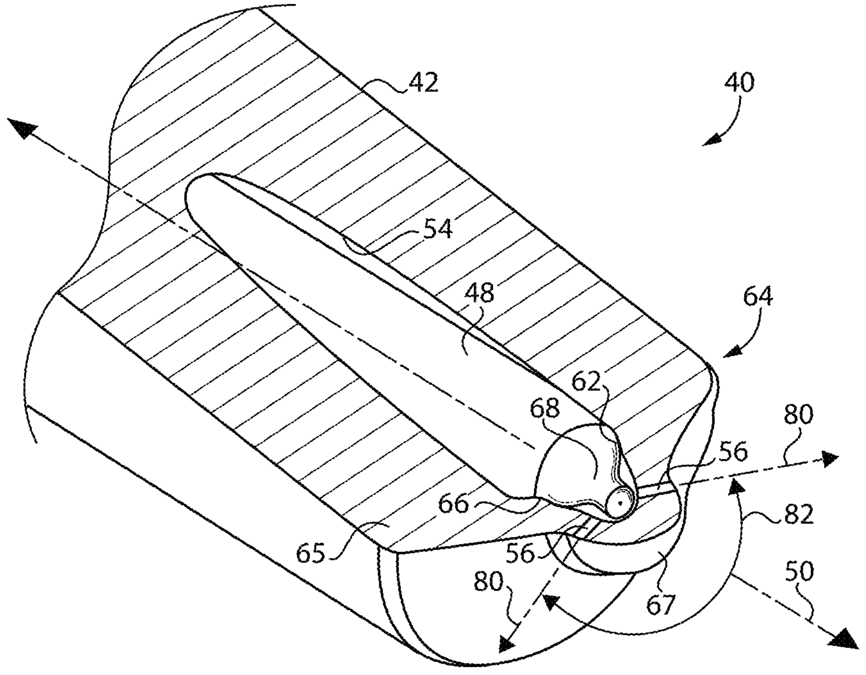
FIG. 2 is a sectioned view of a nozzle assembly, according to one embodiment.

Each of fuel injectors 40, hereinafter referred to at times in the singular, includes an injector housing 42. Within injector housing 42 may be a spill valve assembly 44, an injection control valve assembly 46, and a nozzle check or needle 48. The term needle herein includes various elongate valve members that check a flow of fuel in a closed position against a seat, and permit flow of fuel in an open position. Referring also now to FIG. 2, injector housing 42 defines a longitudinal axis 50 and has formed therein each of a fuel inlet 52, a nozzle passage 54 extending to a plurality of spray orifices 56 each having a spray orifice inlet 58 and a spray orifice outlet 60, and a needle seat 62. Fuel injector 40 further includes a nozzle assembly 64 formed by nozzle needle 48 together with a nozzle body 65. Nozzle body 65 may include an end bulb 67. Nozzle needle 48 is movable within injector housing 42 between a closed needle position blocking each spray orifice 56 from nozzle passage 54, and an open needle position. Nozzle needle 48 also includes a seating surface 66 in contact with needle seat 62 at the closed needle position, and a flow guiding tip 68.

Spray orifices 56, also hereinafter referred to at times in the singular, can include any number of spray orifices, including one spray orifice, but typically from three to nine spray orifices. Spray orifices 56 may be spaced circumferentially around longitudinal axis 50 and define an obtuse included angle 82. In an implementation included angle 82 may be greater than 100°, and in a refinement from approximately 110° to approximately 150°. As will be further apparent from the following description, flow guiding tip 68 is structured to assist in directing fuel through a sac volume 69 directly into spray orifices 56 in a manner contemplated to reduce risk of cavitation phenomena and to improve orifice fuel flow rate.

Figure 3:
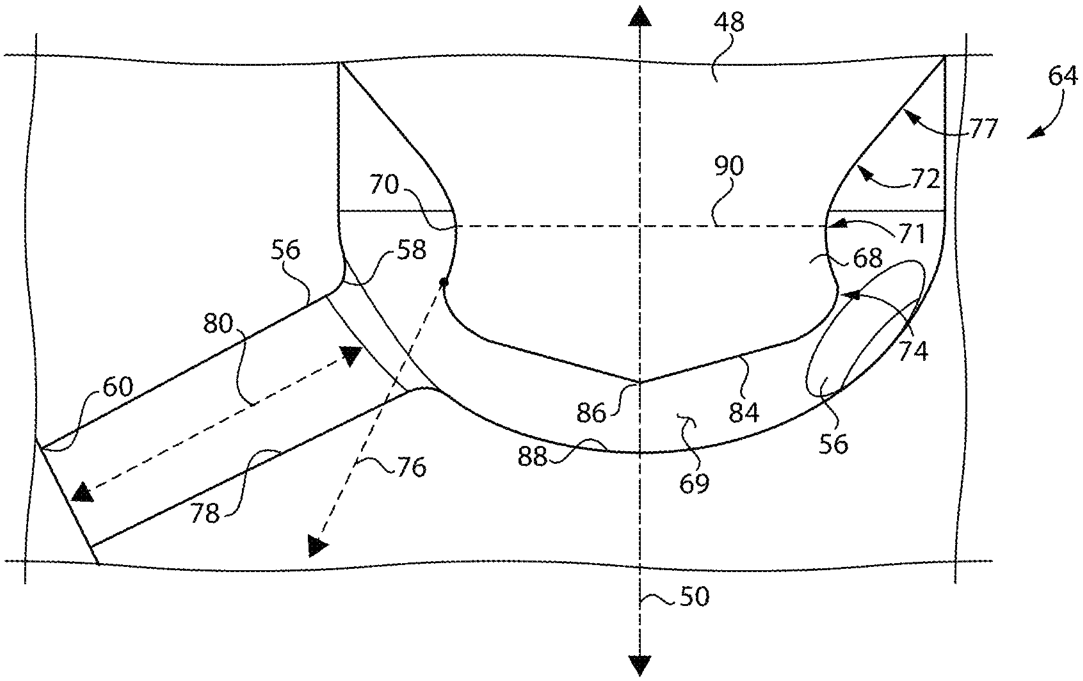
FIG. 3 is a sectioned view of a portion of the nozzle assembly as in FIG. 2.

Referring also now to FIG. 3, flow guiding tip 68 includes an outer ramp surface 70 extending axisymmetrically around longitudinal axis 50. Outer ramp surface 70 defines, in profile, a concave curve 71 originating at an axially inward location 72 and terminating at an axially outward location 74. "Axially inward" means a direction along longitudinal axis 50 toward a geometric center point of fuel injector 40. "Axially outward" is an opposite direction. Outer ramp surface 70 also defines a fuel trajectory line 76 that is tangent to concave curve 71 at axially outward location 74 and extends through spray orifice inlet 58 at the closed needle position. Flow guiding tip 68, more specifically concave outer ramp surface 70, is exposed to sac volume 69 and has a concave profile defining a fuel path extending, at each of a plurality of spray orifice angular locations, circumferentially around longitudinal axis 50, directly into spray orifices 56. As can be seen from FIG. 3, spray orifice 56 includes an inside wall 78 extending circumferentially around a spray orifice axis 80. Fuel trajectory line 76 intersects inside wall 78 between spray orifice inlet 58 and spray orifice outlet 60. More particularly, fuel trajectory line 76 may intersect inside wall 78 at a location that is closer to spray orifice inlet 58 than to spray orifice outlet 60 in some embodiments. Fuel trajectory lines can be understood to be defined at all profiles of ramp surface 70 circumferentially around longitudinal axis 50 with each of spray orifices 56 intersected by a fuel trajectory line.

In FIG. 3 nozzle needle 48 is shown as it might appear at the closed needle position. It can be noted the axially outward location 74 is generally located in axial alignment with spray orifice inlet 58, in other words at an overlapping location in a direction along longitudinal axis 50. In a practical implementation, at the closed needle position axially outward location 74 is axially outward no further than spray orifice 56. Put differently, when nozzle needle 48 is at the closed needle position concave ramp surface 70 extends to a location that is not beyond any of the plurality of spray orifices 56.

With continued reference to FIG. 3, flow guiding tip 68 further includes a terminal end surface 84 originating at axially outward location 74 and extending circumferentially around longitudinal axis 50. Terminal end surface 84 may be at least partially convex, and in the illustrated embodiment is terminally conical and includes a peak 86. Nozzle body 65 includes a sac surface 88 in facing relation to terminal end surface 84. Flow guiding tip 68 further defines a width 90 at a minimum point of concave curve 71. The minimum point is to be understood as a radially innermost point of concave curve 71, or a narrowest part of flow guiding tip 68. An aspect ratio defined as a ratio of width 90 to a perpendicular height of flow guiding tip 68 is greater than 1:1. A height of flow guiding tip 68 may be defined as a linear distance extending, parallel to longitudinal axis 50, from axially inward location 72 to peak 86. In profile, flow guiding tip defines a linear surface segment 77 that extends from axially inward location 72 to seating surface 66. Thus, in the illustrated embodiment flow guiding tip 68 can be understood to define a hyperbola shape, in profile, formed by outer ramp surface 70 that transitions axially inward to a conical shape, in turn transitioning to seating surface 66. In a refinement, the subject aspect ratio may be greater than 2:1.

Figure 4:
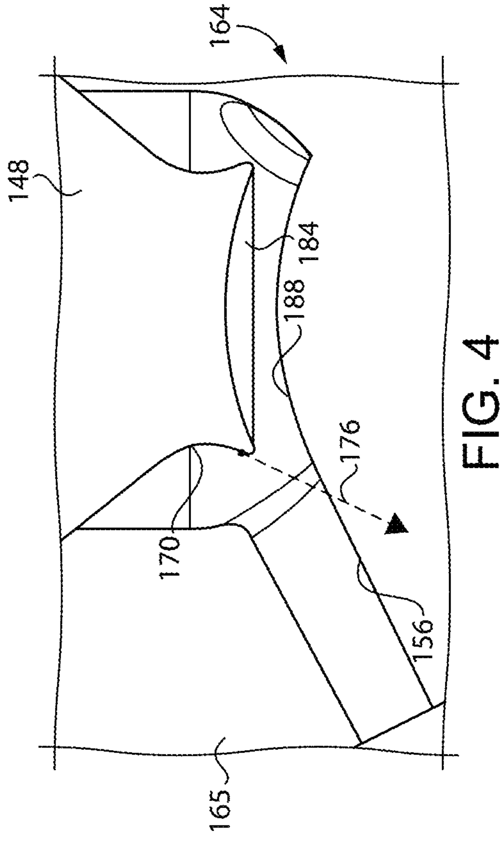
FIG. 4 is a sectioned view of a portion of a nozzle assembly, according to another embodiment.

Referring now to FIG. 4, there is shown a nozzle assembly 164 including a nozzle body 165 and a nozzle needle 148, according to another embodiment. It should be appreciated that description and discussion herein of any one embodiment should be understood by way of analogy to refer to any other embodiment except where otherwise indicated or apparent from the context. In FIG. 4, one of a plurality of spray orifices 156 is shown in the section plane of FIG. 4. Nozzle needle 148 includes an outer ramp surface 170 configured similarly to the foregoing embodiment, and defining a fuel trajectory line 176 tangent to a concave curve at an axially outward location of termination of outer ramp surface 170, extending through a spray orifice inlet of spray orifice 156. Nozzle needle 148 includes a terminal end surface 184 that is at least partially concave. Nozzle body 165 includes a sac surface 188 that is convex and in facing relation to terminal end surface 184. Sac surface 188 is parallel to terminal end surface 184 in the illustrated embodiment.

Figure 5:
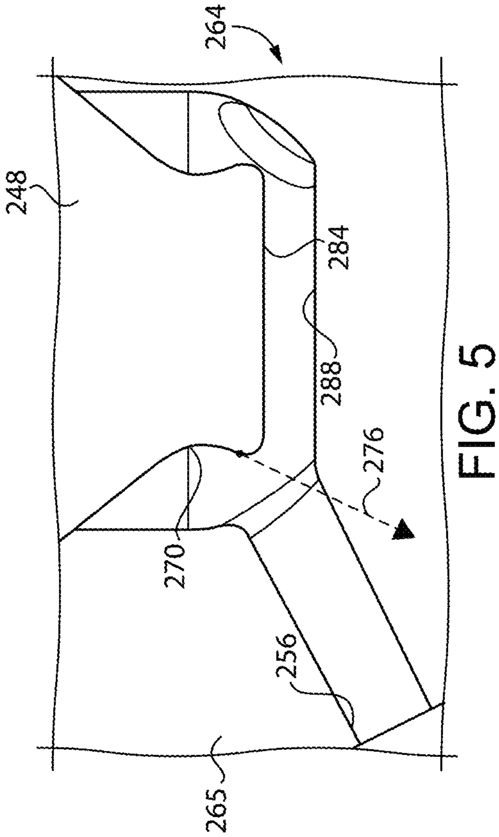
FIG. 5 is a sectioned view of a portion of a nozzle assembly according to yet another embodiment.

Focusing now on FIG. 5, there is shown a nozzle assembly 264 again having certain similarities with foregoing embodiments, and including a nozzle body 265 having a spray orifice 256 formed therein. Nozzle assembly 264 also includes a nozzle needle 248 having an outer ramp surface 270 defining a fuel trajectory line 276 that extends into a spray orifice 256. Nozzle needle 248 includes a terminal end surface 284 that is at least partially planar. Nozzle body 265 includes a planar sac surface 288 that is parallel to terminal end surface 284 and in facing relation therewith. It will be appreciated that embodiments of FIG. 4 and FIG. 5 together can be understood as disclosing a terminal end surface that is at least partially concave or at least partially planar, or potentially both.

Figure 6:
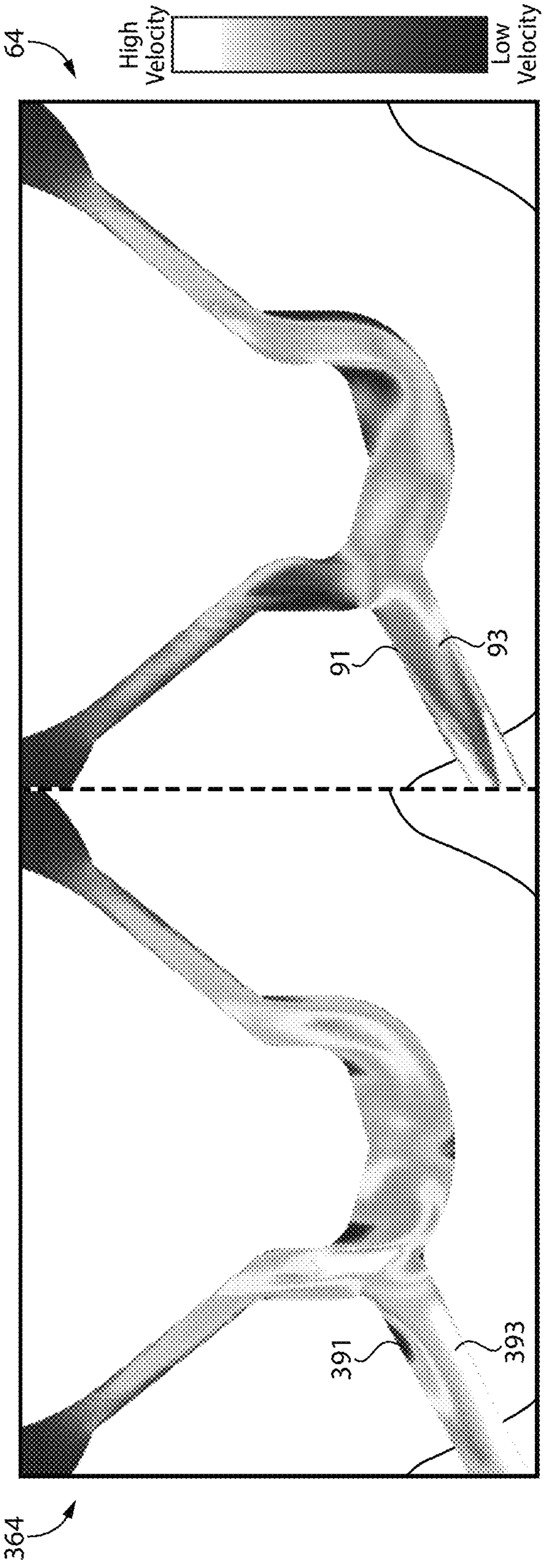
FIG. 6 is a comparative illustration of flow properties of a fuel injector nozzle assembly according to a known design, in comparison to a fuel injector nozzle assembly according to the present disclosure.

Turning now to FIG. 6, there is shown on the lefthand side of the drawing a nozzle assembly 364 according to a known design, and a nozzle assembly 64 on the righthand side according to the present disclosure. FIG. 6 depicts approximate fuel flow velocities that might be observed when nozzle needles in the respective nozzle assemblies are open at similar conditions. In the known design a region 391 is identified that is associated with low fuel velocity and potentially formation of cavitation bubbles. A region of higher fuel velocity through the orifice is shown at 393. In the design according to the present disclosure, a region of only modestly lower fuel velocity is shown at 91, and a region of medium to higher fuel velocity is shown at 93. Such very low velocity regions as can be observed in the known design are believed to contribute to cavitation phenomena that can lead to pocketing or other erosive damage inside the spray orifice. Such phenomena are generally not expected to be observed according to the present disclosure based on the guiding of fuel that occurs via the geometry of the presently disclosed flow guiding tips. Configuring flow guiding tips according to the present disclosure provides for directly targeting both starting flow and ending flow of fuel directly into a spray orifice.

INDUSTRIAL APPLICABILITY

Referring to the drawings generally, but returning focus to the embodiment of FIGS. 2 and 3, operation of fuel system 22 can include rotating camshaft 28 to rotate cams 30 in contact with tappets 32 and pressurize fuel by way of a fuel pressurization plunger within each one of fuel injectors 40. At desired timings spill valve assemblies 44 can be energized, such as by energizing solenoids therein, to enable fuel pressure to build with a spill valve closed. Operation of spill valve assemblies in this general manner is known in the art.

When it is desirable to start fuel injection, injection control valve assembly 46 can be energized, again typically by energizing a solenoid and in a well-known manner, to relieve a closing hydraulic pressure on the respective nozzle needle 48. With fuel pressure relieved, the nozzle needle is moved from a closed needle position closing a needle seat and blocking a sac volume from a nozzle passage in the subject fuel injector, to an open needle position where the needle seat is open. With the nozzle needle lifted, pressurized fuel can be advanced through the sac volume from the fuel passage to a plurality of spray orifices of the fuel injector. The pressurized fuel advanced through the sac volume is impinged upon a concave ramp surface of a flow guiding tip of the nozzle needle, defining fuel trajectory lines at each of a plurality of spray orifice locations extending into the plurality of spray orifices as discussed herein. When fuel injection is to end, the nozzle needle can be moved back to the closed needle position by deenergizing the subject injection control valve assembly.

At this point, and just prior to closing the needle seat, a terminal end surface of the flow guiding tip will approach the facing sac surface of the fuel injector. In the case of the embodiments of FIGS. 4 and 5, the terminal end surface of the flow guiding tip is concave or planar. It is believed that employing a concave or planar terminal end surface can assist particularly in displacing fuel from the sac volume out the plurality of spray orifices as the terminal end surface approaches the facing sac surface. This phenomenon is in turn believed to assist in evacuating residual fuel from the fuel injector and minimizing dribble of remaining fuel after fuel injection is desired to end.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A fuel injector comprising:

an injector housing defining a longitudinal axis and having formed therein each of a fuel inlet, a nozzle passage extending to a spray orifice having a spray orifice inlet and a spray orifice outlet, and a needle seat;

a nozzle needle movable within the injector housing between a closed needle position blocking the spray orifice from the nozzle passage, and an open needle position, and including a seating surface in contact with the needle seat at the closed needle position, and a flow guiding tip; and the flow guiding tip including an outer ramp surface extending axisymmetrically around the longitudinal axis and defining, in profile, a concave curve originating at an axially inward location and terminating at an axially outward location, and a linear fuel trajectory line that is tangent to the concave curve at the axially outward location and extends from the axially outward location in a direction that is radially outward and axially outward of the flow guiding tip through the spray orifice inlet at the closed needle position.

2. The fuel injector of claim 1 wherein the spray orifice includes an inside wall extending circumferentially around a spray orifice axis, and the fuel trajectory line intersects the inside wall between the spray orifice inlet and the spray orifice outlet.

3. The fuel injector of claim 2 wherein the fuel trajectory line intersects the inside wall at a location that is closer to the spray orifice inlet than to the spray orifice outlet.

4. The fuel injector of claim 2 wherein the spray orifice is one of a plurality of spray orifices spaced circumferentially around the longitudinal axis and defining an included spray angle.

5. The fuel injector of claim 1 wherein the axially outward location is axially outward no further than the spray orifice at the closed needle position.

6. The fuel injector of claim 1 wherein the flow guiding tip includes a terminal end surface originating at the axially outward location and extending circumferentially around the longitudinal axis.

7. The fuel injector of claim 6 wherein the terminal end surface is at least partially convex.

8. The fuel injector of claim 6 wherein the terminal end surface is at least partially concave or planar.

9. The fuel injector of claim 8 wherein the injector housing includes a sac surface parallel to the terminal end surface.

10. The fuel injector of claim 1 wherein the flow guiding tip defines a width at a minimum point of the concave curve, and an aspect ratio that is greater than 1:1.

11. A fuel injector nozzle assembly comprising:

a nozzle body including a needle seat, an end bulb, and a plurality of spray orifices formed in the end bulb and arranged at a plurality of spray orifice angular locations around a longitudinal axis;

a nozzle needle movable relative to the needle seat, and including a seating surface in contact with the needle seat;

a sac volume fluidly connected to each of the plurality of spray orifices is defined within the end bulb between the nozzle needle and the nozzle body;

the nozzle needle further including a flow guiding tip having an outer ramp surface exposed to the sac volume and having a concave profile defining a fuel path extending, at each of the plurality of spray orifice angular locations, directly into the plurality of spray orifices; and the concave profile extending from an axially inward location to an axially outward location, and the flow guiding tip defining a width, between the axially inward location and the axially outward location, that is narrowest at a location coincident with a minimum point of the concave profile.

12. The fuel injector nozzle assembly of claim 11 wherein the outer ramp surface extends axisymmetrically around the longitudinal axis and the flow guiding tip defines an aspect ratio that is greater than 1:1.

13. The fuel injector nozzle assembly of claim 12 wherein the aspect ratio is greater than 2:1.

14. The fuel injector nozzle assembly of claim 12 wherein the axially outward location that is axially outward no further than the plurality of spray orifices.

15. The fuel injector nozzle assembly of claim 11 wherein the flow guiding tip includes a concave terminal end surface.

16. The fuel injector nozzle assembly of claim 15 wherein the nozzle body includes a convex sac surface in facing relation to the concave terminal end surface.

17. The fuel injector nozzle assembly of claim 11 wherein the flow guiding tip includes a planar terminal end surface, and the nozzle body includes a planar sac surface in facing relation to the planar terminal end surface.

18. A method of operating a fuel system comprising:

moving a nozzle needle in a fuel injector defining a longitudinal axis from a closed needle position closing a needle seat and blocking a sac volume from a nozzle passage in the fuel injector, to an open needle position where the needle seat is open;

advancing a pressurized fuel through the sac volume from the nozzle passage to a plurality of spray orifices of the fuel injector based on the moving the nozzle needle; and impinging the pressurized fuel advanced through the sac volume upon a concave ramp surface of a flow guiding tip of the nozzle needle defining a plurality of linear fuel trajectory lines at each of a plurality of spray orifice locations, and each of the plurality of linear fuel trajectory lines extending away from the flow guiding tip in a direction that is radially outward and axially outward into a respective one of the plurality of spray orifices; and advancing at least some of the pressurized fuel impinged upon the concave ramp surface along the respective linear fuel trajectory lines directly into the plurality of spray orifices.

19. The method of claim 18 wherein the fuel trajectory lines intersect inner walls of the respective spray orifices at each of the closed needle position and the open needle position.

20. The method of claim 18 further comprising:

moving the nozzle needle back to the closed needle position; and approaching a terminal end surface of the flow guiding tip that is concave or planar to a facing sac surface of the fuel injector during the moving the nozzle needle back to the closed needle position; and displacing fuel from the sac volume out the plurality of spray orifices based on the approaching the terminal end surface to the facing sac surface.

* * * * *